(12) United States Patent
Fleischer et al.

(10) Patent No.: US 8,913,249 B2
(45) Date of Patent: Dec. 16, 2014

(54) OPTICAL SYSTEM FOR ILLUMINATING A MEASURED OBJECT AND INTERFEROMETRIC SYSTEM FOR MEASURING SURFACES OF A MEASURED OBJECT

(75) Inventors: Matthias Fleischer, Ostfildern (DE); Pawel Drabarek, Tiefenbronn (DE)

(73) Assignee: Robert Bosch GmbH, Stuttgart (DE)

( * ) Notice: Subject to any disclaimer, the term of this patent is extended or adjusted under 35 U.S.C. 154(b) by 871 days.

(21) Appl. No.: 12/736,658

(22) PCT Filed: Apr. 16, 2009

(86) PCT No.: PCT/EP2009/054513
§ 371 (c)(1), (2), (4) Date: Feb. 9, 2011

(87) PCT Pub. No.: WO2009/132964
PCT Pub. Date: Nov. 5, 2009

(65) Prior Publication Data
US 2011/0122414 A1    May 26, 2011

(30) Foreign Application Priority Data
Apr. 30, 2008    (DE) .................. 10 2008 001 473

(51) Int. Cl.
*G01B 11/02* (2006.01)
*G01B 9/02* (2006.01)

(52) U.S. Cl.
CPC .......... *G01B 9/02021* (2013.01); *G01B 9/0209* (2013.01); *G01B 9/02028* (2013.01); *G01B 9/02007* (2013.01)

USPC ........................................... 356/497

(58) Field of Classification Search
USPC .................. 356/485, 503, 479, 497
See application file for complete search history.

(56) References Cited

U.S. PATENT DOCUMENTS

| | | | |
|---|---|---|---|
| 2,841,049 A | 7/1958 | Scott | |
| 3,597,091 A | 8/1971 | Bowker | |
| 6,847,458 B2 * | 1/2005 | Freischlad et al. | 356/503 |
| 7,239,397 B2 * | 7/2007 | Badami et al. | 356/503 |

(Continued)

FOREIGN PATENT DOCUMENTS

| | | |
|---|---|---|
| DE | 10 2004 045 806 | 4/2006 |
| DE | 10 2004 045 808 | 4/2006 |

(Continued)

OTHER PUBLICATIONS

"Interferometer Measues Both Sides of Disk", Laser Focus World, Pennwell, Tulsa, OK, US, Sep. 1, 1997, pp. 52/53, XP001182916, ISSN : 1043-8092.

*Primary Examiner* — Tarifur Chowdhury
*Assistant Examiner* — Jonathon Cook
(74) *Attorney, Agent, or Firm* — Kenyon & Kenyon LLP

(57) ABSTRACT

An interferometric system for measuring surfaces of a measured object using an optical system. The optical system has a beam splitter, which directs measuring beams in a first beam path and measuring beams in a second beam path onto the surfaces of the measured object with the aid of two mirrors. The beam paths which are formed by the light beams which are reflected on the surfaces at least partially overlap in an area having identical beam direction. In this manner, measured surfaces of the measured object are at least partially imaged on an identically irradiated surface of a detector, such as an image recorder.

19 Claims, 2 Drawing Sheets

(56) References Cited

U.S. PATENT DOCUMENTS

| | | | |
|---|---|---|---|
| 7,426,039 B2 | 9/2008 | Badami et al. | |
| 2004/0174535 A1 | 9/2004 | Kuramoto | |
| 2006/0139656 A1* | 6/2006 | Kulawiec et al. | 356/512 |
| 2008/0117429 A1* | 5/2008 | Strahle | 356/503 |

FOREIGN PATENT DOCUMENTS

| | | |
|---|---|---|
| FR | 1 153 098 | 2/1958 |
| JP | 51-29424 | 8/1976 |
| JP | 59-197809 | 11/1984 |
| JP | 60-244804 | 12/1985 |
| JP | 1-143906 | 6/1989 |
| JP | 2-167502 | 6/1990 |
| JP | 8-61927 | 3/1996 |
| JP | 2000-146517 | 5/2000 |
| JP | 2003-194523 | 7/2003 |
| JP | 2003-254708 | 9/2003 |
| JP | 2005-43099 | 2/2005 |
| JP | 2006-90950 | 4/2006 |
| JP | 2007-113974 | 5/2007 |
| JP | 2009-36601 | 2/2009 |
| WO | WO 2006/071569 | 7/2006 |

* cited by examiner

OPTICAL SYSTEM FOR ILLUMINATING A MEASURED OBJECT AND INTERFEROMETRIC SYSTEM FOR MEASURING SURFACES OF A MEASURED OBJECT

FIELD OF THE INVENTION

The present invention relates to an optical system for illuminating at least one surface of a measured object and an interferometric system for measuring surfaces of a measured object.

BACKGROUND INFORMATION

An interferometric measuring device for measuring an object, in particular for measuring the thickness of the object, is discussed in German patent application DE-OS 10 2004 045 806 A1. Described is a construction of a Michelson interferometer having a light source, a beam splitter for forming reference beams and object beams, a reference mirror in the reference light path, and an image recorder. A special objective is situated in the object light path. It divides the object beams into two partial object beams.

Both partial object beams are each directed onto a deflection mirror. The partial object beams which are deflected on the mirrors are used for the simultaneous, perpendicular illumination of two object surfaces, which are parallel to one another. The partial object beams which are reflected on the object surfaces are superimposed with the reference beams and are incident on the image recorder of the measuring device. Interference phenomena occur in the case of the superposition when the reference beams and the reflected partial object beams have the same optical path length. The image recorder registers the interference patterns which are formed. This optical path length at which interferences occur is ascertained for each of the reflected partial object beams of an object surface. This is performed by displacing the reference mirror in the reference light path until reference patterns are formed. On the basis of the ascertained optical path lengths for both partial object beams, the distance of both object surfaces to one another, and thus the thickness of the object at the location of the measured object surfaces, are inferred.

The division of the object beams in the special objective into two partial object beams is performed in the form of an aperture division. Two partial cross sections of the object beams, which are contiguous per se, are each separated into two partial object beams having a separate beam path. The partial object beams which are reflected on the object surfaces are joined together again in the same direction at the position of the performed aperture division.

The object beams which are joined together have non-overlapping partial cross sections, which are contiguous per se, and through which exclusively reflected partial object beams of an object surface pass. This has the result that only a specific partial surface of an image recorder, which is typically square, is exclusively exposed by the particular reflected partial object beams of an object surface. Accordingly, the measured object surfaces are imaged separately from one another on the particular partial areas of the image recorder. A unique assignment of the measuring signals on a partial surface of the image recorder to the measured object surfaces is thus made possible.

SUMMARY OF THE INVENTION

The exemplary embodiments and/or exemplary methods of the present invention are based on the object of proposing an optical system for illuminating at least one surface of a measured object, in which a beam path of light beams which are reflected on a first object surface at least partially overlaps with a beam path of light beams which are reflected on a second object surface, all light beams being oriented in an identical direction in the area of the overlap.

Furthermore, it is the object to situate an optical system in an interferometric measuring system, measured object surfaces being imaged at least partially on an identically irradiated surface of a detector, such as an image recorder.

These objects are achieved according to the exemplary embodiments and/or exemplary methods of the present invention by an optical system for illuminating at least one object surface and by an interferometric system for measuring object surfaces according to the characterizing features of the independent claims.

The optical system according to the present invention for illuminating at least one object surface provides at least one first optical element, which implements at least one first beam path and at least one second beam path if light beams of a radiation-generating light source are introduced in it. The light beams in the first beam path are directed, which may be perpendicularly, onto a first object surface via a second optical element, which is downstream in the light path from the first optical element. Furthermore, light beams in the second beam path are directed, which may be perpendicularly, onto a second object surface via a third optical element, which is downstream in the light path from the first optical element.

The light beams in the first beam path advantageously originate from the largest possible area of the cross section of the light beams which are introduced onto the first optical element, which may be from the complete cross section. Furthermore, the light beams in the second light beam path also originate from the largest possible area of the cross section of the light beams which are introduced onto the first optical element, which may also be from the complete cross section.

In addition, further optical elements may be situated for guiding the introduced light beams, the light beams in the at least one first beam path, and/or the light beams in the at least one second beam path. In this case, this means guiding the light beams to an object surface and/or guiding the reflected light beams away from the particular object surface.

The light beams, which are directed at least approximately perpendicularly onto the object surfaces and then reflected, then pass through the first and/or second beam paths previously formed to an object surface back in the opposite direction.

The reflected light beams in the first beam path and the reflected light beams in the second beam path are advantageously oriented parallel to one another at least on one longitudinal section of their light path in each case.

A particularly great advantage results if the first and the second beam paths of the reflected light beams have an at least partial spatial overlap. It is additionally advantageous if the reflected light beams from the first and second beam path are oriented parallel to one another within this overlap. This means that both the reflected light beams from the first beam path and also the reflected light beams from the second beam path pass through the spatial overlap of the beam paths. The overlap of the beam paths of the reflected light beams may be initiated by the system of the at least one first optical element. A complete overlap of the beam paths of the reflected light beams is particularly advantageous. The cross section of the overlap advantageously corresponds to the total cross section of the light beams introduced into the optical system.

The optical system according to the exemplary embodiments and/or exemplary methods of the present invention may be situated in a measuring beam path of an interferometer measuring head. The measuring beams are thus introduced into the optical system according to the present invention and used for illuminating the object surfaces. In this manner, an interferometric system according to the present invention for measuring object surfaces is thus advantageously obtained.

The interferometric system according to the exemplary embodiments and/or exemplary methods of the present invention has the advantage with respect to the related art that ideally a large measuring field may be implemented as the illuminated object surface, in particular when the entire cross section of the measuring beams introduced within the optical system according to the present invention is used in each case to form the at least one first beam path and/or the at least one second beam path.

It is very particularly advantageous that a large detector surface, which may be the entire detector surface, may be used to image the particular measured object surface on a detector. This is made possible in that the beam paths of the light beams which are reflected on the object surfaces at least partially, which may be completely, overlap and the reflected light beams may be incident on the detector surface centered in the middle. This means that at least partially identical areas of the detector surface may be exposed during the measurement of a first object surface and a second object surface. Thus, during the measurement of circular object surfaces, a surface of the detector, which is four times as large in comparison to the related art, may advantageously be used for the imaging.

The lateral resolution thus also advantageously doubles during the measurement of an object surface using an interferometric system according to the present invention. This means that the measurement of the same object surfaces is performed substantially more precisely than is the case using a measuring device known heretofore. It is also possible to use a smaller detector for an at least equal measuring precision and/or an object surface to be measured which is at least equally large. Vice versa, it is also possible to maintain the detector size, and instead to reduce the cross section of the measuring beams which are introduced into the optical system according to the present invention. The object surfaces to be measured are thus advantageously illuminated using a greater light intensity. Therefore, even poorly reflecting object surfaces may be imaged on the detector.

SUMMARY OF THE INVENTION

Advantageous refinements and improvements of these systems specified herein are possible through the measures listed and further described herein.

Thus, in a refinement of the optical system according to the present invention for illuminating at least one surface of a measured object, the optical elements may be situated in such a way that the light beams which are directed onto the first object surface are directed parallel or antiparallel to the light beams which are directed onto the second object surface. Object surfaces which are situated parallel to one another may accordingly be illuminated. The distance of both object surfaces to one another may be ideally measured within an interferometric system according to the present invention. The thickness of the object at the position of the measured object surfaces may therefore be determined in the case of parallel surfaces directed in opposite directions. The parallelism of the object surfaces to one another may also be checked.

In a refinement of the optical system according to the present invention, it is particularly advantageous if at least one optical element is a beam splitter. The guidance of the light beams which are incident on the beam splitter may advantageously be influenced in such a way that the light beams are split and therefore light beams are formed at least in a first beam path and light beams are formed at least in a second beam path. A beam splitter is to be understood in this case as an optical element, in which light beams in the at least one first formed beam path and in the at least one second formed beam path originate from at least one identical cross-sectional area of the light beams which are introduced into the beam splitter, which may be from the entire cross section. A very simple beam splitter of this type is a partially mirror-coated glass pane, which is situated at an angle of 45° to the introduced light beams, for example. If a part of the incident light beams is reflected on the object surface of the pane at an angle of 90°, a further part penetrates the pane. In its widespread form, such a beam splitter includes two prisms, which are cemented together at their base (e.g., using an optical adhesive such as the UV adhesive Norland Optical Adhesive 63).

In a specific embodiment, the first optical element for forming at least one first beam path and at least one second beam path is a beam splitter. The at least one first object surface and the at least one second object surface are advantageously illuminated simultaneously.

Furthermore, in one embodiment variant, a beam splitter is used in which the light beams in the formed first beam path may be oriented perpendicularly to the light beams which are incident on the beam splitter. Furthermore, a beam splitter is proposed in which the light beams in the formed second beam path are directed rectified and without deflection onto the light beams incident on the beam splitter. Such a proposed optical system may be positioned within an interferometric system according to the present invention in such a way that the optical axis of the formed second beam path is on the optical axis of the measuring beams which are formed in the interferometric system.

In general, it is advantageous for an optical system according to the present invention if at least one optical element is a mirror or a prism, in order to deflect light beams in a desired beam direction by reflection, for example. Light deflections as a result of light refraction within the prism may be avoided. Otherwise, spectral splitting of the light additionally occurs. In the case of an interferometric system according to the present invention having an optical system used in this way, deviating measurement results may occur.

A further advantageous specific embodiment of the optical system according to the present invention proposes that a mirror and/or a prism be used as the second and/or third optical element, which is downstream from the first optical element. The use of prisms may be desired, in particular if such a proposed optical system is used within an interferometric system according to the present invention. Interferometric systems typically have a fixed—so-called—operating length. This operating length is the maximum covered optical path of measuring beams which are reflected on an object surface, in which focused imaging of the object surface may still be achieved on the detector via the objective. Prisms advantageously lengthen this operating distance by one-third of the glass distance traveled. In addition, the danger of air flows, which typically negatively influence the measurement result, occurring in the beam path is reduced.

It is generally advantageous for an optical system according to the present invention if at least one optical element for refracting the light beams is a lens or a lens system. The cross section of the light beams may advantageously be reduced in the direction of the light path. The light intensity in the adjoining beam path may thus be enlarged. It is also possible to enlarge the cross section of the light beams. Overall, for example, a larger object surface may thus be illuminated.

Optical elements which may deflect light beams by reflection in more than one beam direction are generally advantageous for an optical system according to the present invention. For example, this is possible by rotatably arranging the optical element. A rotatably arranged first optical element, such as a mirror or a prism, is advantageous in particular. It is thus possible to illuminate exclusively one object surface in a corresponding rotational position. All light beams which are incident on the rotatable first optical element may be directed exclusively on the object surface via the second optical element, for example. In the same manner, the second object surface may be exclusively illuminated by a changed rotational position.

Such a proposed optical system within an interferometric system according to the present invention has the advantage that only one object surface may always be imaged on the detector for an object measurement. A clear assignment of the measuring signals of the detector to the measured object surface is thus provided. Because all measuring beams which are introduced into the optical system may thus be used for illuminating the object surface, an advantageously large light yield results for the measuring procedure.

Optical elements, which may be folded out of the at least one first beam path or the at least one second beam path formed by the first optical element, are generally advantageous for an optical system according to the present invention. This is advantageously performed in such a way that the elements no longer participate in guiding the light beams. Mirrors and/or prisms may particularly be used. It is thus possible to exclusively illuminate one object surface at a time in such a system of the optical elements. Thus, for example, light beams in a first beam path may be directed onto a first surface. The illumination of the second object surface is suspended simultaneously, in that the second optical element is folded out of the second beam path, for example. The light beams in the second light beam path are thus no longer directed onto the second object surface.

Such a proposed optical system according to the present invention within an interferometric system according to the present invention has the advantage that only one object surface may always be imaged on the detector for an object measurement. A unique assignment of the measuring signals of the detector to the measured object surface is thus provided.

Exemplary embodiments of the present invention are shown in the drawings and are described in greater detail in the following description.

DETAILED DESCRIPTION

Figure 1:
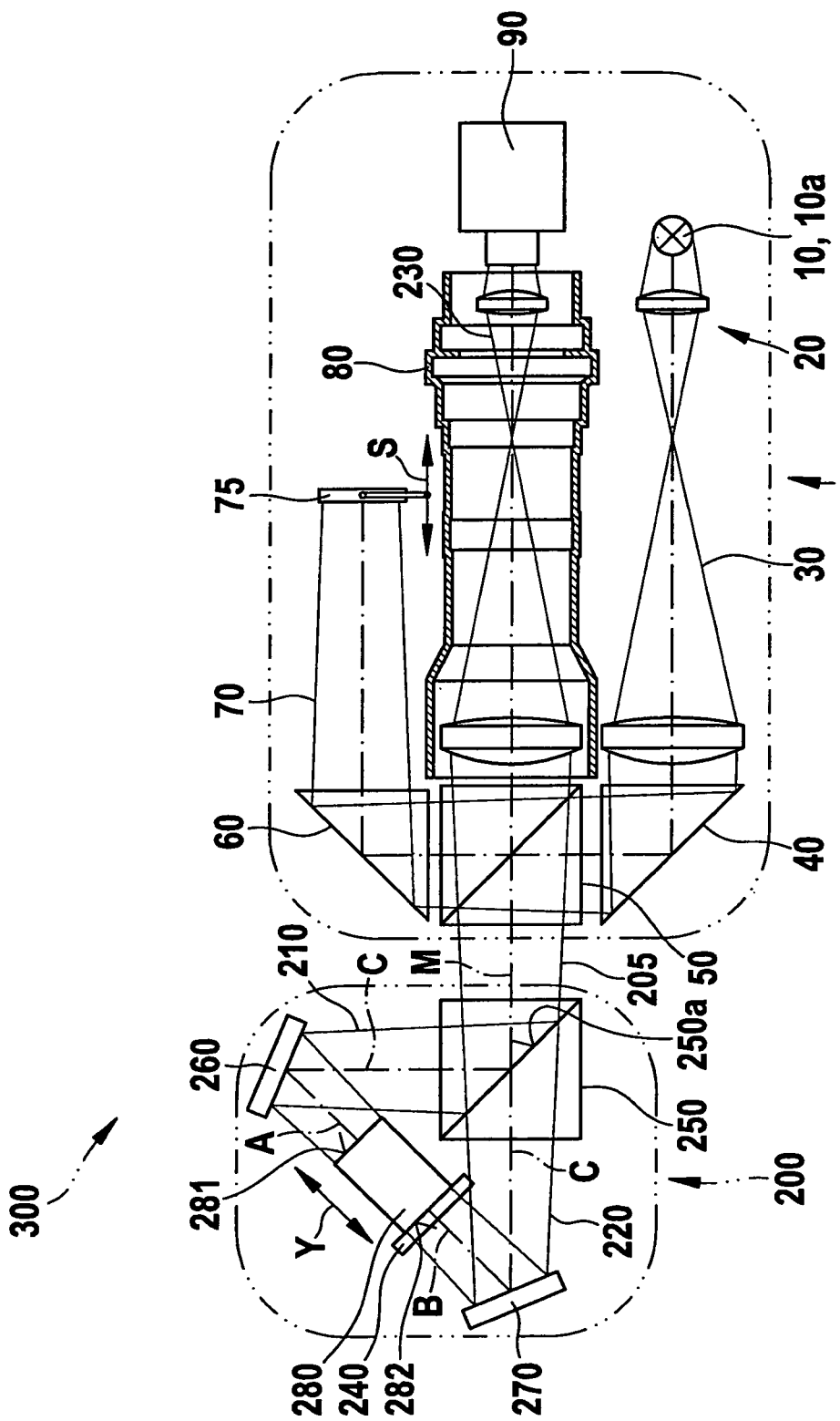
FIG. 1 schematically shows a first specific embodiment of an interferometric measuring system according to the present invention having an optical system for illuminating at least one surface of a measured object, in longitudinal section.

A first specific embodiment of an interferometric system 300 according to the present invention for measuring object surfaces is shown in FIG. 1. An interferometer measuring head is identified by reference numeral 100. Interferometer measuring head 100 is constructed in the form of a planar measuring interferometer. The construction contains a radiation-generating light source 10, which emits short coherent light beams, such as white light, into an illumination optics 20. An illumination beam path 30 is thus formed. A first roof prism 40, which is situated in illumination beam path 30, causes a deflection of the light beams in such a way that the light beams are directed perpendicularly onto a first beam splitter 50. First beam splitter 50 causes a division of the light beams into one part of reference beams within a reference beam path 70 and one part of measuring beams within a measuring beam path 205.

The reference beams are oriented in the same direction and the measuring beams are oriented at a right angle to the light beams of illumination beam path 30, which are incident on beam splitter 50. The reference beams are deflected via a second roof prism 60, which is situated in reference beam path 70, in such a way that they are directed perpendicularly onto a reference element 75, such as a reference mirror. The reference beams which are reflected on reference element 75 thus pass back through reference beam path 70 again in the opposite direction via roof prism 60 up to beam splitter 50. Through a further perpendicular deflection by beam splitter 50, the reference beams are finally directed perpendicularly through an objective 80, which is situated in the light path, onto a detector 90, such as a photosensitive element of a camera. The beam direction of the reference beams, which are incident on detector 90, is opposite to that of the measuring beams, which are formed by first beam splitter 50.

An optical system 200 according to the exemplary embodiments and/or exemplary methods of the present invention is situated in measuring beam path 205 of interferometer measuring head 100. The measuring beams are directed onto a second beam splitter 250. The optical axis of measuring beam path 205 is advantageously congruent with the optical axis of second beam splitter 250. An offset of the optical axes is permissible, in particular up to an offset dimension at which it is ensured that the measuring beams are incident on second beam splitter 250 using the entire cross section of measuring beam path 205. Second beam splitter 250 corresponds to a first optical element within optical system 200 for forming a first beam path 210 and a second beam path 220. Light beams in first beam path 210 are oriented perpendicularly to the measuring beams, while in contrast the light beams in second beam path 220 run as a linear extension to the measuring beams, which are incident on second beam splitter 250.

The light beams both in first beam path 210 and also in second beam path 220 may advantageously originate from the entire cross section of measuring beam path 205. Accordingly, the light beams within first and second beam paths 210, 220 are also measuring beams, each having a light intensity which is less due to the division. In addition, the cross section of first and second beam paths 210, 220 advantageously corresponds to the cross section of measuring beam path 205.

A first mirror 260 is situated in first beam path 210 in such a way that measuring beams are also directed perpendicularly by reflection onto a first object surface 281 of a measured object 280. A second mirror 270 is also situated in second beam path 220 in such a way that measuring beams are directed onto a second object surface 282 of measured object 280. Measured object 280 is situated having second object surface 282 resting on a radiation-transparent support 240. Accordingly, proposed interferometric system 300 is positioned in space in such a way that first object surface 281 is illuminated from above in vertical spatial direction y and second object surface 282 is illuminated from below through radiation-transparent support 240 in vertical spatial direction y.

The measuring beams which are reflected on first and second object surfaces 281, 282 pass back through the first and second beam paths 210, 220 in the opposite direction via first and second mirrors 260, 270 up to second beam splitter 250. The reflected measuring beams from second beam path 220 are introduced without deflection axially parallel into objective 80, such as a telecentric objective, and directed perpendicularly onto detector 90. The measuring beams in first beam path 210, in contrast, are deflected by second beam splitter 250 perpendicularly to their beam direction up to this point and are introduced axially parallel into objective 80 and also directed perpendicularly onto detector 90.

The beam path of the measuring beams which are reflected on first object surface 281 and the beam path of the measuring beams which are reflected on second object surface 282 are congruent within imaging beam path 230 of objective 80. The reflected measuring beams which are incident on detector 90 interfere with the reference beams, which are also contained in imaging beam path 230 and are incident on detector 90. Measured object 280 is situated within optical system 200 in such a way that the measuring beams which are incident on first object surface 281 and then reflected and the measuring beams which are incident on second object surface 282 and also reflected pass through different optical paths. The total path difference of both optical path lengths may be greater than the coherence length of light source 10. This prevents the measuring beams which are reflected from first object surface 281 and second object surface 282 from interfering with one another. An interference with the reference beams occurs when the optical path length of the measuring beams corresponds to the optical path length of the reference beams.

The optical path length of the reference beams may be increased or decreased by displaceably arranging reference element 75 on the optical path axis of the reference beams. A change and adaptation of the optical path length for the measuring beams of first object surface 281 or second object surface 282 may be achieved by a relative displacement of interferometer measuring head 100 and optical system 200 in the direction of optical axis M. An alternative embodiment variant provides that first mirror 260, second mirror 270, and/or second beam splitter 250 are each displaceably arranged relative to the measured object in the direction of their optical axis A, B, C, optionally in addition to a possible displacement of interferometer measuring head 100.

The distance of first object surface 281 to second object surface 282 corresponds to the object thickness. Before the object thickness of a measured object 280 is ascertained by a measuring procedure, interferometric system 300 is calibrated in a first step using a gauge block of known thickness. The gauge block is positioned on support 240 in place of measured object 280. Interferometer measuring head 100 is displaced into the position in which the optical path from beam-splitting surface 250a of second beam splitter 250 up to first object surface 281 corresponds to the optical path from beam splitting surface 250a of second beam splitter 250 up to reference element 75. In this position, the measuring beams which are reflected on first object surface 281 interfere with the reference beams, so that a corresponding first interference pattern is visible on detector 90. The gauge block is positioned in such a way that the optical path from beam-splitting surface 250a of second beam splitter 250 to second object surface 282 is slightly longer or shorter than the optical path length of the reference beams. The measuring beams which are reflected on second object surface 282 therefore do not interfere with the reference beams.

A second interference pattern is accordingly also not visible on detector 90. The second reference pattern only becomes visible on detector 90 due to the displacement of reference element 75, for example, in the direction of optical axis S of reference beam path 70. The first reference pattern is simultaneously no longer visible on detector 90. The displacement of reference element 70, for example, between the first interference pattern, which is implemented by first object surface 281, and the second reference pattern, which is implemented by second object surface 282, is measured using a high-precision position encoder, for example. The displacement path of reference element 75 which is thus ascertained is stored as a calibration constant. Subsequently, measured object 280 is measured in the same manner and the distance of reference element 75 between the first implemented interference pattern and the second implemented interference pattern is ascertained. The object thickness is calculated from the known thickness of the gauge block, the previously ascertained calibration constant, and the distance of reference element 75 which is ascertained for the measured object.

A further specific embodiment of an interferometric system according to the exemplary embodiments and/or exemplary methods of the present invention provides at least one light source 10a, which emits long coherent light, such as laser light. The remaining construction of an interferometer measuring head 100 remains unchanged.

If a light source 10a having long coherent light beams is used, simultaneous exposure of detector 90 by measuring beams, which are reflected on first object surface 281 and second object surface 282, is ideally to be suppressed. Otherwise, interference may also occur between the measuring beams, which are reflected on first object surface 281 and second object surface 282, in spite of different optical path lengths. Interference patterns, which could be assigned uniquely to first or second object surface 281, 282 by the displacement of reference element 75 in the direction of optical axis S, for example, are therefore not implemented.

Figure 2A:
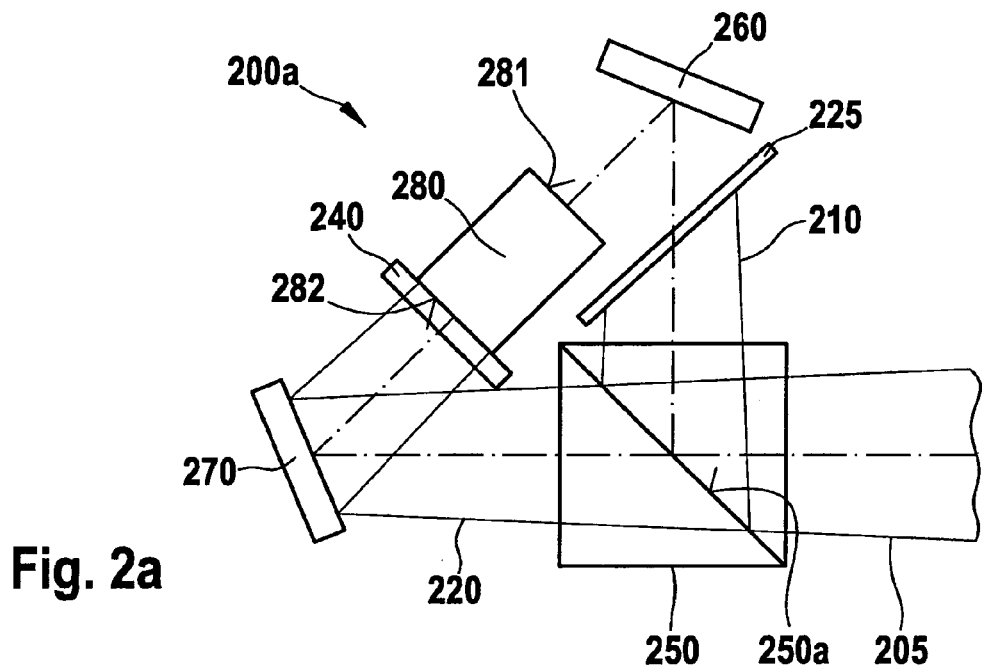
FIG. 2a schematically shows an embodiment variant of an optical system having an aperture in a first position within an interferometric system, in longitudinal section.

In a first embodiment variant of an interferometric system using long coherent light, a light source 10a is provided in such a way that interferometer measuring head 100a may be used as a multiple wavelength interferometer. For example, two laser beams may be used for this purpose, whose wavelengths have a very small difference in comparison to one another. In a similar way, such a light source 10a may be used that interferometer measuring head 100a is implemented as an interferometer having a displaceable wavelength. For this purpose, for example, a laser source may be provided as light source 10a, which may be tuned to various laser frequencies. In this embodiment variant of an interferometric system, an embodiment of an optical system 200a according to FIG. 2a may be situated in measuring beam path 205. The construction of optical system 200a essentially corresponds to the above-described construction of optical system 200 in FIG. 1. In contrast thereto, a movable aperture 225 is provided in first and second beam paths 210, 220. During the measurement of first object surface 281, aperture 225 in second beam path 220 may be positioned in such a way that no measuring beams are incident on second object surface 282. First object surface 281 may therefore be exclusively imaged on detector 90 by interference with the reference beams.

Figure 2B:
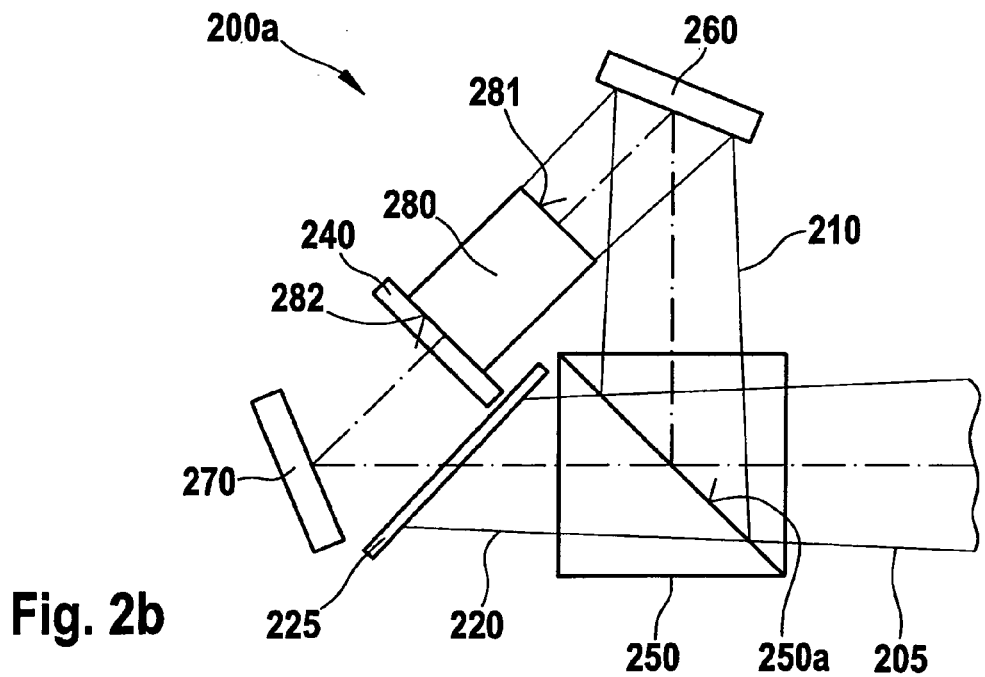
FIG. 2b shows the embodiment variant from FIG. 2a having a second position of the aperture, in longitudinal section.

A similar method is used in the measurement of second object surface 282. According to FIG. 2b, aperture 225 may be situated in first beam path 281 in such a way that no measuring beams are incident on first object surface 281. Second object surface 282 may therefore be exclusively imaged on detector 90 by interference with the reference beams. In this manner, the planarity, the parallelism of both object surfaces 281, 282 to one another, and the object thickness may be measured. To ascertain the object thickness, during the measurement of first object surface 281, the phase difference of the two different components of laser beams in the measuring beams, having minimally different wavelengths, are ascertained on detector 90. The number of the periods within the optical path which result in such a phase shift may thus be determined. The optical path length which is covered by the measuring beams which are reflected on first object surface 281 is accordingly also known. In the same manner, the optical path length which is covered by the measuring beams which are reflected on second object surface 282 may also be ascertained. The object thickness may thus be inferred in the simplest manner.

The interferometric system may further be varied in that light source 10a emits long coherent light having a first light wavelength or long coherent light having a second light wavelength by being turned on and off electrically. For example, two alternately activated laser units are conceivable for the provision of light beams having different light wavelengths. A construction, which essentially corresponds to the already described construction of optical system 200 in FIG. 1, may be used for optical system 200.

In contrast thereto, a first color filter for filtering the measuring beams having the first light wavelength is situated within first beam path 210. In a similar manner, a second color filter for filtering the measuring beams having the second light wavelength is positioned in second beam path 220. As a function of whether the light having the first light wavelength or the light having the second light wavelength is turned on for the illumination, either first object surface 281 or second object surface 282 may thus be imaged on detector 90. Alternatively, instead of the color filter and second beam splitter 250, a dichroic (color-separating) beam splitter 250 may be used as the first optical element.

An additional embodiment variant of the interferometric system provides a light source 10a, which emits long coherent light having a first polarization direction or long coherent light having a second polarization direction, in each case by being turned on and off electrically. For example, two alternately activated laser units are conceivable, which may have having laser beams which are polarized perpendicularly to one another.

A construction may particularly be used for optical system 200 which essentially corresponds to the above-described construction of optical system 200 in FIG. 1. In contrast thereto, second beam splitter 250 which is used is a polarized beam splitter. Either first object surface 281 or second object surface 282 may be imaged on detector 90 as a function of whether the light having the first polarization direction or the light having the second polarization direction is turned on for the illumination.

In general, the above-described embodiment variants of an interferometric system for measuring object surfaces 281, 282 using long coherent light beams are also possible using short coherent light beams. The signal quality is thus positively influenced.

This is also true for an alternative specific embodiment of an interferometric system according to the present invention for measuring object surfaces using short coherent or long coherent light.

The construction essentially corresponds to the construction of interferometric system 300 in FIG. 1. In contrast thereto, light source 10 may emit short coherent light or also long coherent light. In contrast to optical system 200, instead of second beam splitter 250, a further mirror is advantageously used, which may be folded out of measuring beam path 205. In a first position, the mirror is situated in such a way that all measuring beams from interferometer measuring head 100 may be directed on first mirror 260 and thus illuminate first object surface 281. In this case, first object surface 281 is exclusively imaged on detector 90. In a further position, the mirror is folded completely out of measuring beam path 205. In this case, all measuring beams from interferometer measuring head 100 may be directed onto second mirror 270 and accordingly may exclusively illuminate second object surface 282. Accordingly, in this beam guidance of the measuring beams, second object surface 282 may be exclusively imaged on detector 90.

What is claimed is:

1. An optical system for illuminating at least one surface of a measured object, comprising:
a beam-generating light source to introduce light beams;
a first optical element;
a second optical element, wherein the first optical element is for forming at least one first beam path and at least one second beam path, which are situated so that light beams in the at least one first beam path are directed by the second optical element, which is downstream from the first optical element, perpendicularly onto a first object surface; and
a third optical element, wherein light beams in the at least one second beam path are directed by the third optical element, which is downstream from the first optical element, onto a second object surface, wherein the at least one first beam path of the light beams which are reflected on the first object surface and the at least one second beam path of the light beams which are reflected on the second object surface at least partially overlap in an area having beam directions which are oriented parallel to one another;
wherein a total path difference of both optical path lengths is greater than a coherence length of the light source such that the beams reflected from the first object surface and the second object surface are prevented from interfering with each other.

2. The optical system of claim 1, wherein light beams which are incident perpendicularly on the first object surface in the at least one first beam path are oriented one of parallel and antiparallel to the light beams which are incident perpendicularly on the second object surface in the at least one second beam path.

3. The optical system of claim 1, wherein at least one of the first, second, and third optical elements is at least one beam splitter.

4. The optical system of claim 1, wherein at least one of the first, second, and third optical elements is at least one mirror.

5. The optical system of claim 4, wherein at least one of the first, second, and third optical elements is at least one prism.

6. The optical system of claim 1, wherein at least one of the first, second, and third optical elements is at least one lens or lens system.

7. The optical system of claim 5, wherein at least one of the mirror and the prism is foldable out of at least one of the at least one first beam path and the at least one second beam path.

8. The optical system of claim 1, wherein the first optical element is a beam splitter, and wherein at least one of the following is satisfied: (i) the light beams are deflected perpendicularly to the direction of incidence of the light beams which are incident on the beam splitter in at least one first beam path, and (ii) the light beams are directed further without deflection in the direction of the light beams which are incident on the beam splitter in the at least one second beam path.

9. The optical system of claim 1, wherein at least one of the second optical element and the third optical element includes at least one of a mirror and a prism.

10. The optical system of claim 1, wherein a movable aperture is situated in at least one of the at least one first beam path and the at least one second beam path.

11. The optical system of claim 1, further comprising:
color filters for filtering light beams of different wavelengths are situated in at least one of the at least one first beam path and the at least one second beam path.

12. The optical system of claim 1, wherein the first optical element is a dichroic (color-separating) beam splitter for separating light beams having different wavelengths.

13. The optical system of claim 1, wherein the optical elements and the measured object are movably arranged relative to one another.

14. The optical system of claim 1, wherein the measured object is situated having at least one object surface on a radiation-transparent support, which is a glass plate.

15. An interferometric system for measuring surfaces of a measured object, comprising:
an interferometer measuring head; and
an optical system for illuminating at least one surface of a measured object, including:
a radiation-generating light source;
an illumination optics for forming an illumination beam path;
a reference element;
a beam splitter for dividing the light beams emitted by the light source into partial light beams, wherein the partial light beams are at least used as the measuring beams in a measuring beam path for illuminating a measured object and at least as reference beams, which are directed onto the reference element;
an objective for forming an imaging beam path of the measuring beams, which are reflected from the measured object; and
a detector for imaging the interference pattern from the superposition of the measuring beams, which are reflected from the measured object, wherein the reference beams are included;
wherein the optical system for illuminating the at least one surface of a measured object is situated in the measuring beam path of the interferometer measuring head;
wherein a total path difference of both optical pathlengths is greater than a coherence length of the light source such that the beams reflected from a first object surface and a second object surface are prevented from interfering with each other.

16. The interferometric system of claim 15, wherein the light source emits one of short coherent light (white light) or long coherent light.

17. The interferometric system of claim 15, wherein the light source emits light beams having at least two different wavelengths, in a frequency-shifting manner, and wherein the light beams of one wavelength are each able to be turned on and off.

18. The interferometric system of claim 15, wherein the light source emits light beams having at least two different polarization directions, which are two light beams which are polarized perpendicularly to one another, and wherein the light beams of each polarization direction are able to be turned on and off.

19. The interferometric system of claim 15, wherein the interferometer measuring head and the optical system are displaceably arranged relative to one another in the direction of the optical axis M of the exiting measuring beams.

* * * * *